United States Patent [19]

Sarff

[11] Patent Number: 5,528,852
[45] Date of Patent: Jun. 25, 1996

[54] ROTATING CYLINDER RODENT TRAP

[76] Inventor: Extry R. Sarff, P.O. Box WWP, Ketchikan, Ak. 99950-0280

[21] Appl. No.: 446,426

[22] Filed: May 22, 1995

[51] Int. Cl.⁶ .................................................. A01M 23/10
[52] U.S. Cl. ...................................... 43/71; 43/64; 43/69
[58] Field of Search .............................................. 43/71, 74

[56] References Cited

U.S. PATENT DOCUMENTS

| 864,200 | 8/1907 | Shelton | 43/72 |
| 1,090,750 | 3/1914 | Peach | 43/17 |

OTHER PUBLICATIONS

"American Builder", Robert Laughlin, Jul. 1951, p. 182.

Primary Examiner—Jack W. Lavinder
Assistant Examiner—Allyson Abrams
Attorney, Agent, or Firm—Michael J. Tavella; Hugh Smith

[57] ABSTRACT

A trap for capturing rodents within a bucket. The inventive device includes an axle having a cylinder rotatably positioned thereon. A mounting assembly secures the axle across an open upper end of a container. A ramp extends from a ground surface to the upper end of the container, whereby a comestible paste applied to the cylinder will lure a rodent up the ramp and onto the cylinder which rotates to deposit the rodent into the container.

2 Claims, 4 Drawing Sheets

PRIOR ART  FIG 1
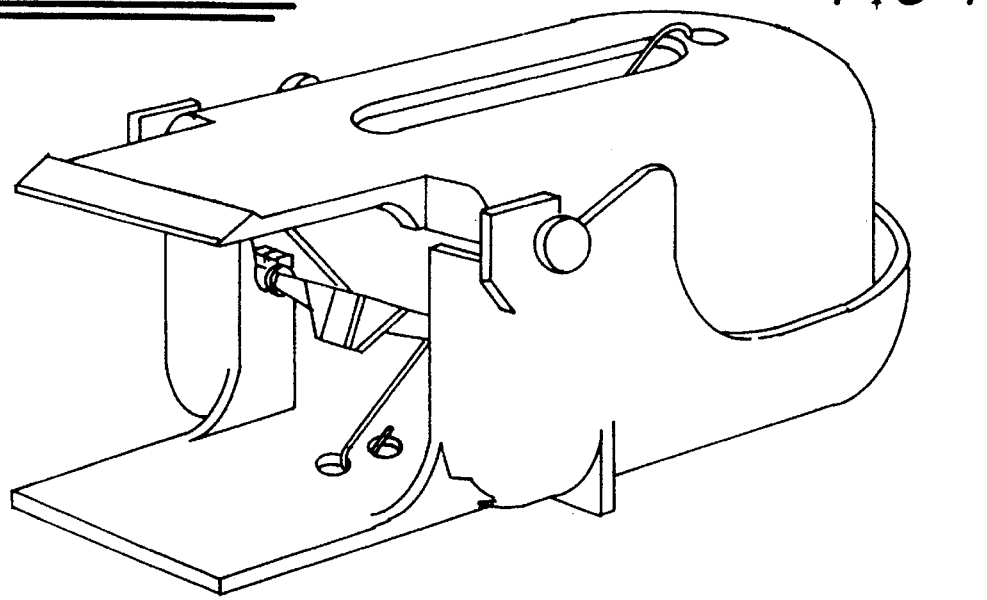
PRIOR ART  FIG. 2
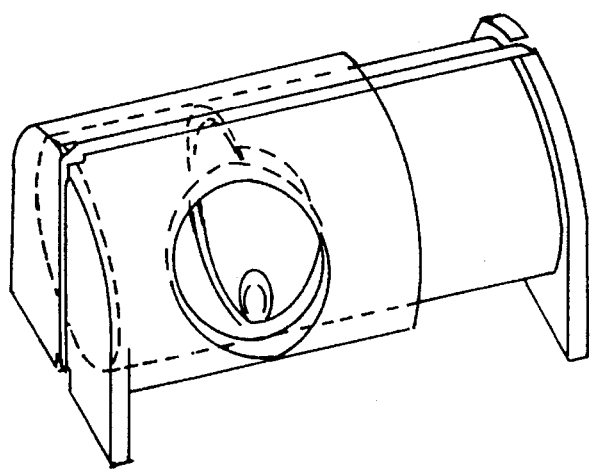

ROTATING CYLINDER RODENT TRAP

BACKGROUND OF THE INVENTION

1. Field of the Invention

The present invention relates to trapping devices and more particularly pertains to a rotating cylinder rodent trap for capturing rodents within a bucket.

2. Description of the Prior Art

The use of trapping devices is known in the prior art. More specifically, trapping devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art trapping devices include U.S. Pat. No. 5,175,957; U.S. Pat. No. 4,438,584; U.S. Design Pat. No. 323,016; U.S. Design Pat. No. 283,434; and U.S. Design Pat. No. 244,773.

While these devices fulfill their respective, particular objectives and requirements, the aforementioned patents do not disclose a rotating cylinder rodent trap for capturing rodents within a bucket which includes an axial having a cylinder rotatably positioned thereon, a mounting assembly securing the axle across an open upper end of a container, and a ramp extending from a ground surface to the upper end of the container, whereby a comestible paste applied to the cylinder will lure a rodent up the ramp and onto the cylinder which rotates to deposit the rodent into the container.

In these respects, the rotating cylinder rodent trap according to the present invention substantially departs from the conventional concepts and designs of the prior art, and in so doing provides an apparatus primarily developed for the purpose of capturing rodents within a bucket.

SUMMARY OF THE INVENTION

In view of the foregoing disadvantages inherent in the known types of trapping devices now present in the prior art, the present invention provides a new rotating cylinder rodent trap construction wherein the same can be utilized for capturing rodents. As such, the general purpose of the present invention, which will be described subsequently in greater detail, is to provide a new rotating cylinder rodent trap apparatus and method which has many of the advantages of the trapping devices mentioned heretofore and many novel features that result in a rotating cylinder rodent trap which is not anticipated, rendered obvious, suggested, or even implied by any of the prior art trapping devices, either alone or in any combination thereof.

To attain this, the present invention generally comprises a trap for capturing rodents within a bucket. The inventive device includes an axle having a cylinder rotatably positioned thereon. A mounting assembly secures the axle across an open upper end of a container. A ramp extends from a ground surface to the upper end of the container, whereby a comestible paste applied to the cylinder will lure a rodent up the ramp and onto the cylinder which rotates to deposit the rodent into the container.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new rotating cylinder rodent trap apparatus and method which has many of the advantages of the trapping devices mentioned heretofore and many novel features that result in a rotating cylinder rodent trap which is not anticipated, rendered obvious, suggested, or even implied by any of the prior art trapping devices, either alone or in any combination thereof.

It is another object of the present invention to provide a new rotating cylinder rodent trap which may be easily and efficiently manufactured and marketed.

It is a further object of the present invention to provide a new rotating cylinder rodent trap which is of a durable and reliable construction.

An even further object of the present invention is to provide a new rotating cylinder rodent trap which is susceptible of a low cost of manufacture with regard to both materials and labor, and which accordingly is then susceptible of low prices of sale to the consuming public, thereby making such rotating cylinder rodent traps economically available to the buying public.

Still yet another object of the present invention is to provide a new rotating cylinder rodent trap which provides in the apparatuses and methods of the prior art some of the advantages thereof, while simultaneously overcoming some of the disadvantages normally associated therewith.

Still another object of the present invention is to provide a new rotating cylinder rodent trap for capturing rodents within a bucket.

Yet another object of the present invention is to provide a new rotating cylinder rodent trap which includes an axial having a cylinder rotatably positioned thereon, a mounting assembly securing the axle across an open upper end of a container, and a ramp extending from a ground surface to the upper end of the container, whereby a comestible paste applied to the cylinder will lure a rodent up the ramp and onto the cylinder which rotates to deposit the rodent into the container.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a prior art trapping device.

FIG. 2 is an isometric illustration of another prior art trapping device.

DESCRIPTION OF THE PREFERRED EMBODIMENT

With reference now to the drawings, and in particular to FIGS. 3–8 thereof, a new rotating cylinder rodent trap embodying the principles and concepts of the present invention will be described.

Referring initially to FIGS. 1 and 2 wherein prior art trapping devices are illustrated, it can be shown that the prior art teaches containers which selectively close so as to capture a rodent or mouse therewithin.

Figure 3:
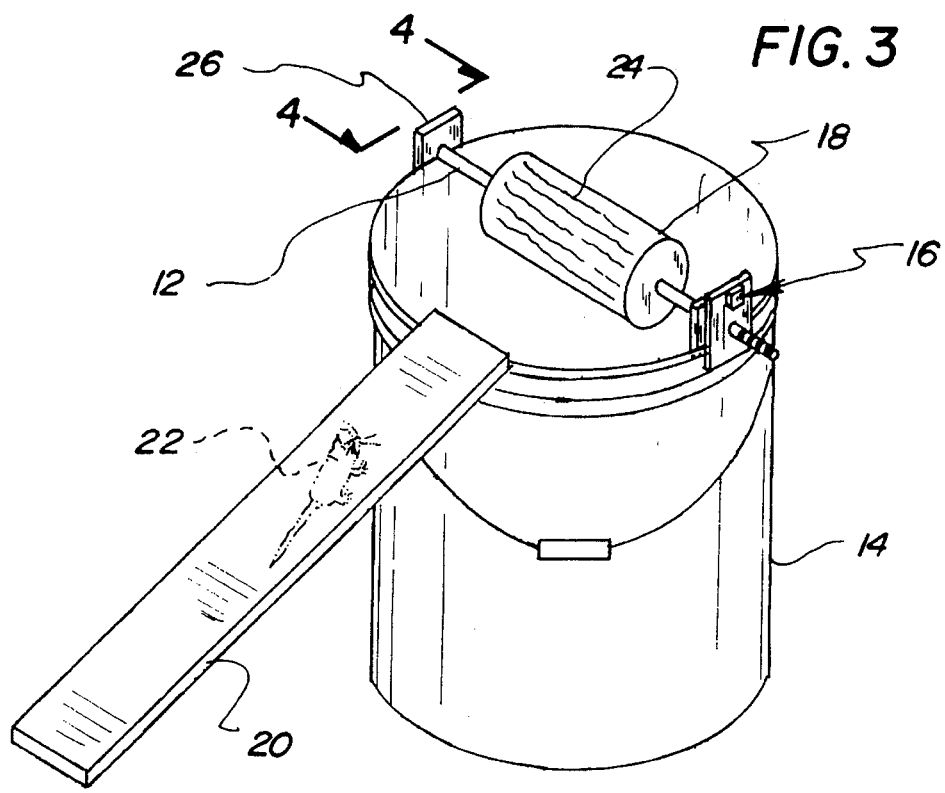
FIG. 3 is all isometric illustration of a rotating cylinder rodent trap according to the present invention.
Figure 4:
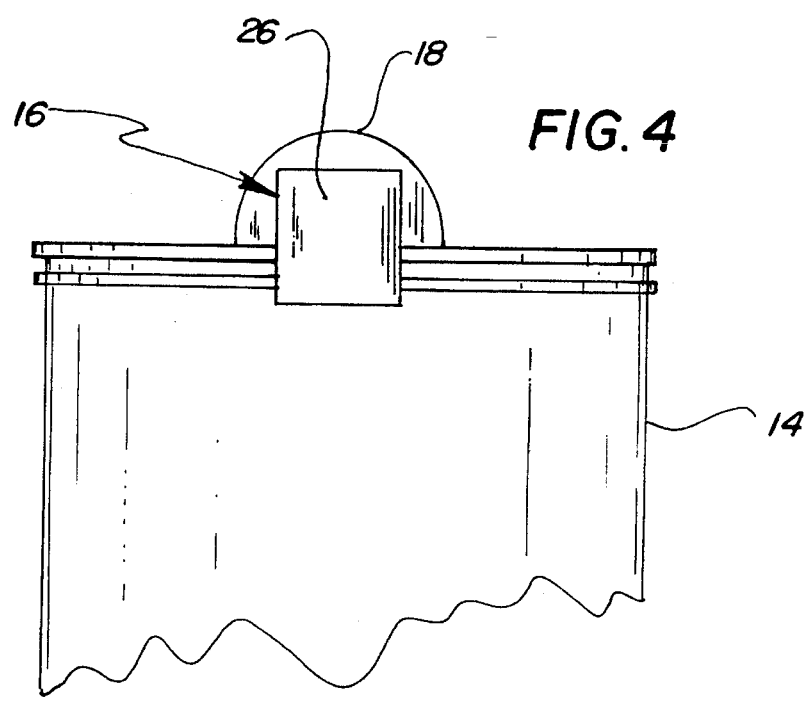
FIG. 4 is a side elevation view of the invention taken from line 4—4 of FIG. 3.
Figure 5:
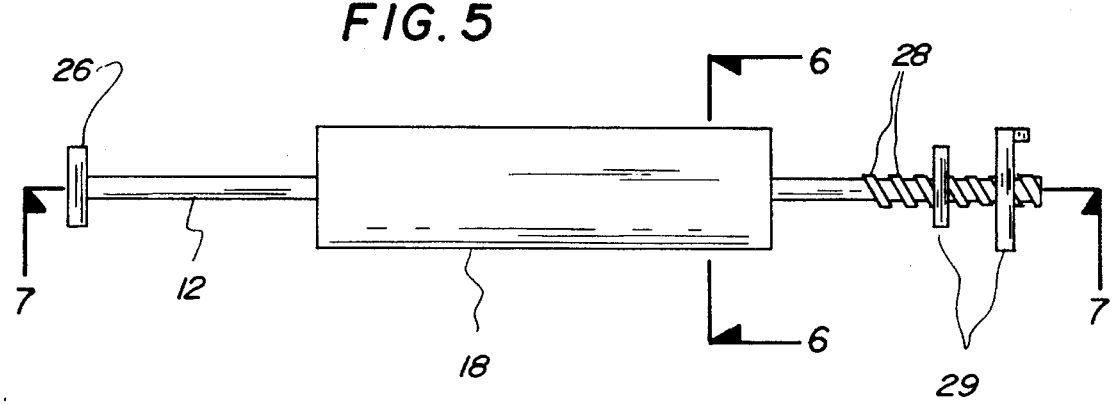
FIG. 5 is an elevation of a portion of the present invention.

Referring now to FIGS. 3 through 8 wherein the present invention is illustrated in detail, it can be shown that the rotating cylinder rodent trap of the present invention substantially departs from the designs and concepts of the prior art and comprises an axle 12 of substantially elongated configuration positionable across an open upper end of a container 14. A mounting means 16 is provided for securing the axle 12 across the open upper end of the container 14 as illustrated in FIG. 3 of the drawings. A cylinder 18 is rotatably mounted about the axle 12 so as to be positioned in a substantially horizontal orientation centered over the open upper end of the container 14. A ramp 20 extends from the open upper end of the container 14 and downwardly therefrom so as to reside upon a ground surface upon which the container 14 is positioned such that a rodent 22 can traverse the ramp 20 to the open upper end of the container 14. A comestible paste 24 such as peanut butter or like viscous materials is coated about the cylinder 18 and operates to attract or lure the rodent 22 up the ramp 20. The rodent 22, upon reaching the upper most end of the ramp 20 will likely jump onto the cylinder 18 so as to gain access to the comestible paste 24. The cylinder 18 will then rotate about the axle 12 so as to deposit the rodent 22 into the container 14. If desired, the container 14 can be filled with a fluid or poisonous material lethal to the rodent 22.

As illustrated in FIGS. 4 through 8, it can be shown that the mounting means 16 preferably comprises an end plate 26 secured to a first end of the axle 12, with the axle including exterior threads 28 extending thereinto from a second of the axle. A pair of clamp plates 29 are threadably engaged to the exterior threads 28 of the axle 12 and can be adjustably or axially advanced relative to the axle 12 to effect clamping of a side wall of the container 14 as shown in FIG. 3 of the drawings. By this structure, the mounting means 16 permits selectively securement of the axle 12 diametrically across the open upper end of the container 14.

Figure 6:
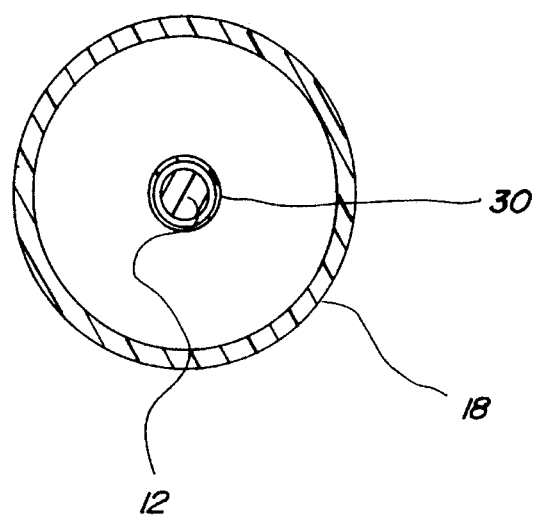
FIG. 6 is a cross sectional view taken along line 6—6 of FIG. 5.
Figure 7:
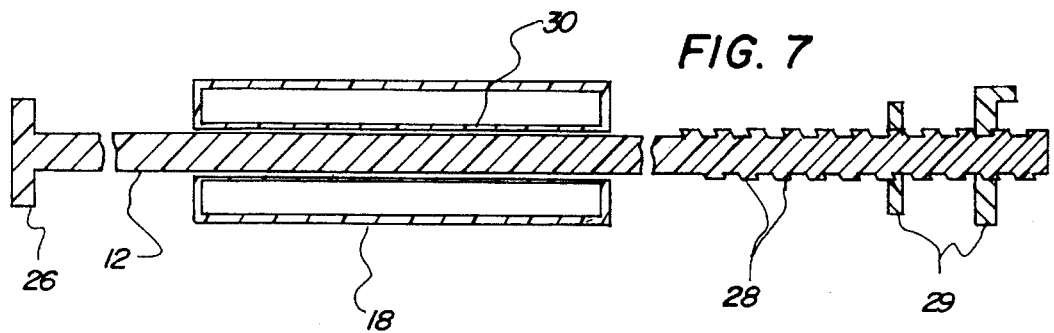
FIG. 7 is a cross sectional view taken along line 7—7 of FIG. 5.
Figure 8:
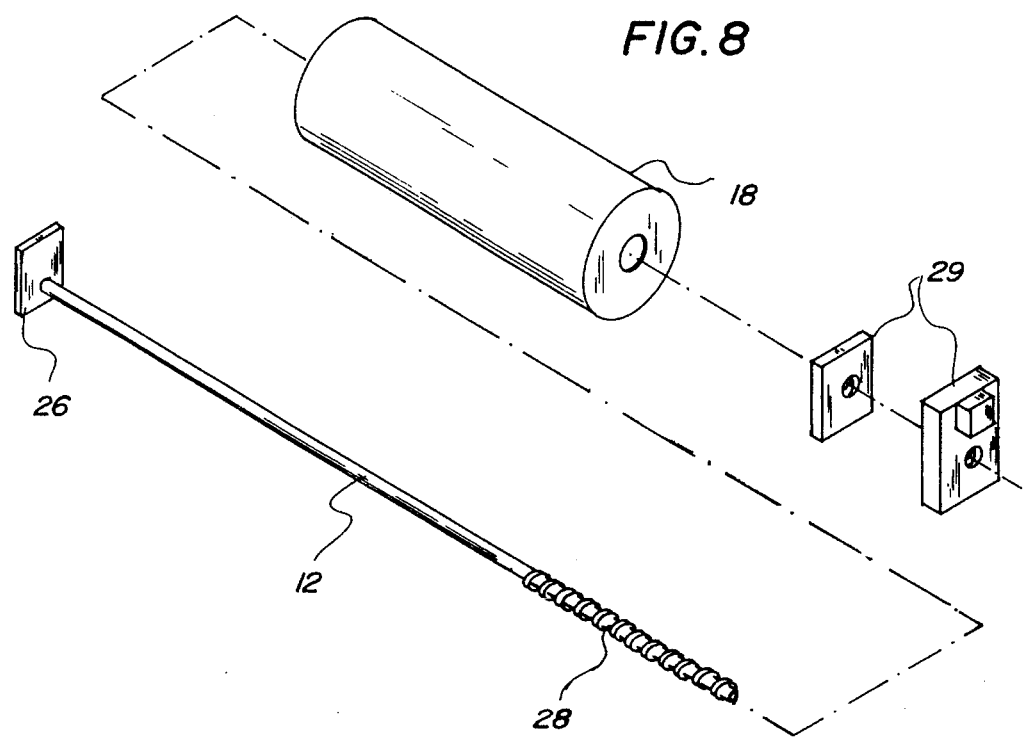
FIG. 8 is an exploded isometric illustration of a portion of the present invention.

As shown in FIGS. 6 and 7, the cylinder 18 is preferably substantially hollow in configuration so as to reduce a moment of inertia thereof, with an inner axle tube 30 extending concentrically through a center of the cylinder 18 which receives the axle 12 therethrough as specifically shown in FIG. 6 of the drawings.

In use, the rotating cylinder rodent trap according to the present invention can be easily utilized to effect capturing of a rodent 22 or other mobile animal within the container 14. The present invention is advantageous in that resetting of the trap is unnecessary inasmuch all of the exterior surface of the cylinder 18 can be coated with the comestible paste 24 so as to ensure visibility thereof by a rodent 22 residing at a top of the ramp 20.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A rotating cylinder rodent trap comprising:

a container;

an axle of substantially elongated configuration positioned across an open end of said container;

a cylinder rotatably mounted about the axle so as to be positioned in a substantially horizontal orientation centered over the open upper end of the container;

a ramp extending from the open upper end of the container and downwardly therefrom so as to be positionable upon a second surface;

and a mounting means for securing the axle across the open upper end of said container, said mounting means comprising an end plate secured to a first end of the axle, with the axle including exterior threads on a second end of the axle; a pair of clamp plates threadably engaged to the exterior threads of the axle wherein the clamp plates are axially advanced relative to the axle to effect clamping of a side wall of the container.

2. The rotating cylinder rodent trap of claim 1, wherein the cylinder is substantially hollow in configuration and includes an inner axle tube extending concentrically through a center of the cylinder which receives the axle therethrough.

* * * * *